(12) United States Patent
Senatori

(10) Patent No.: US 9,501,106 B2
(45) Date of Patent: Nov. 22, 2016

(54) LOCKING ASSEMBLY

(71) Applicant: HEWLETT-PACKARD DEVELOPMENT COMPANY, L.P., Houston, TX (US)

(72) Inventor: Mark David Senatori, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/771,495

(22) PCT Filed: Mar. 28, 2013

(86) PCT No.: PCT/US2013/034440
§ 371 (c)(1),
(2) Date: Aug. 30, 2015

(87) PCT Pub. No.: WO2014/158172
PCT Pub. Date: Oct. 2, 2014

(65) Prior Publication Data
US 2016/0004280 A1 Jan. 7, 2016

(51) Int. Cl.
*G06F 1/16* (2006.01)
*E05D 11/10* (2006.01)

(52) U.S. Cl.
CPC ............ *G06F 1/1679* (2013.01); *E05D 11/105* (2013.01); *E05D 11/1007* (2013.01); *G06F 1/162* (2013.01); *G06F 1/1681* (2013.01)

(58) Field of Classification Search
CPC ..... G06F 1/162; G06F 1/1679; G06F 1/1681
USPC .......................... 361/679.06, 679.27, 679.55
See application file for complete search history.

(56) References Cited

U.S. PATENT DOCUMENTS

| | | | |
|---|---|---|---|
| 5,206,790 A * | 4/1993 | Thomas | F16M 11/10 16/342 |
| 7,239,505 B2 | 7/2007 | Keely et al. | |
| 7,308,733 B2 * | 12/2007 | An | G06F 1/162 16/367 |
| 7,346,960 B2 | 3/2008 | Higano et al. | |
| 7,515,405 B2 * | 4/2009 | Lev | G06F 1/162 361/679.07 |
| 7,548,414 B2 * | 6/2009 | Hung | G06F 1/162 361/679.26 |
| 7,576,982 B2 * | 8/2009 | Wang | G06F 1/162 345/204 |
| 7,619,879 B2 | 11/2009 | Aoyama et al. | |
| 7,619,882 B2 * | 11/2009 | Nakajima | E05D 3/10 361/679.26 |
| 7,800,893 B2 * | 9/2010 | Tracy | G06F 1/162 248/921 |
| 7,987,559 B2 | 8/2011 | Chou | |
| 2003/0090862 A1 * | 5/2003 | Hsiang | G06F 1/1618 361/679.06 |

(Continued)

FOREIGN PATENT DOCUMENTS

EP 1480109 A2 11/2004
WO WO-2012/129728 A1 10/2012

OTHER PUBLICATIONS

"Windows 8's Three Android Advantages", < http://www.theopensourcery.com/keepopen/2012/windows-8s-three-android-advantages/ > Oct. 19, 2012.

*Primary Examiner* — Adrian S Wilson
(74) *Attorney, Agent, or Firm* — HP Inc. Patent Department

(57) ABSTRACT

A locking assembly is disclosed herein. An example includes a first cam lobe and a first cam lobe lock coupled to the first cam lobe. The example additionally includes a first cam lobe lock recess that receives the first cam lobe lock via movement of the first cam lobe to limit rotation of a panel of a computing device about a shaft.

13 Claims, 16 Drawing Sheets

(56) References Cited

U.S. PATENT DOCUMENTS

| | | | |
|---|---|---|---|
| 2004/0105227 A1* | 6/2004 | Tanimoto | G06F 1/162 361/679.06 |
| 2004/0228081 A1* | 11/2004 | Lee | G06F 1/162 361/679.06 |
| 2006/0256516 A1* | 11/2006 | Cho | G06F 1/1616 361/679.29 |
| 2006/0279920 A1 | 12/2006 | Lee et al. | |
| 2009/0165249 A1 | 7/2009 | Hung | |
| 2009/0300881 A1 | 12/2009 | Lin | |
| 2011/0085297 A1* | 4/2011 | Wright-Johnson | G06F 1/1681 361/679.55 |
| 2011/0110670 A1 | 5/2011 | Atkinson | |
| 2011/0127184 A1* | 6/2011 | Kawada | G06F 1/1637 206/320 |
| 2014/0055923 A1* | 2/2014 | Mori | H05K 5/0226 361/679.01 |

\* cited by examiner

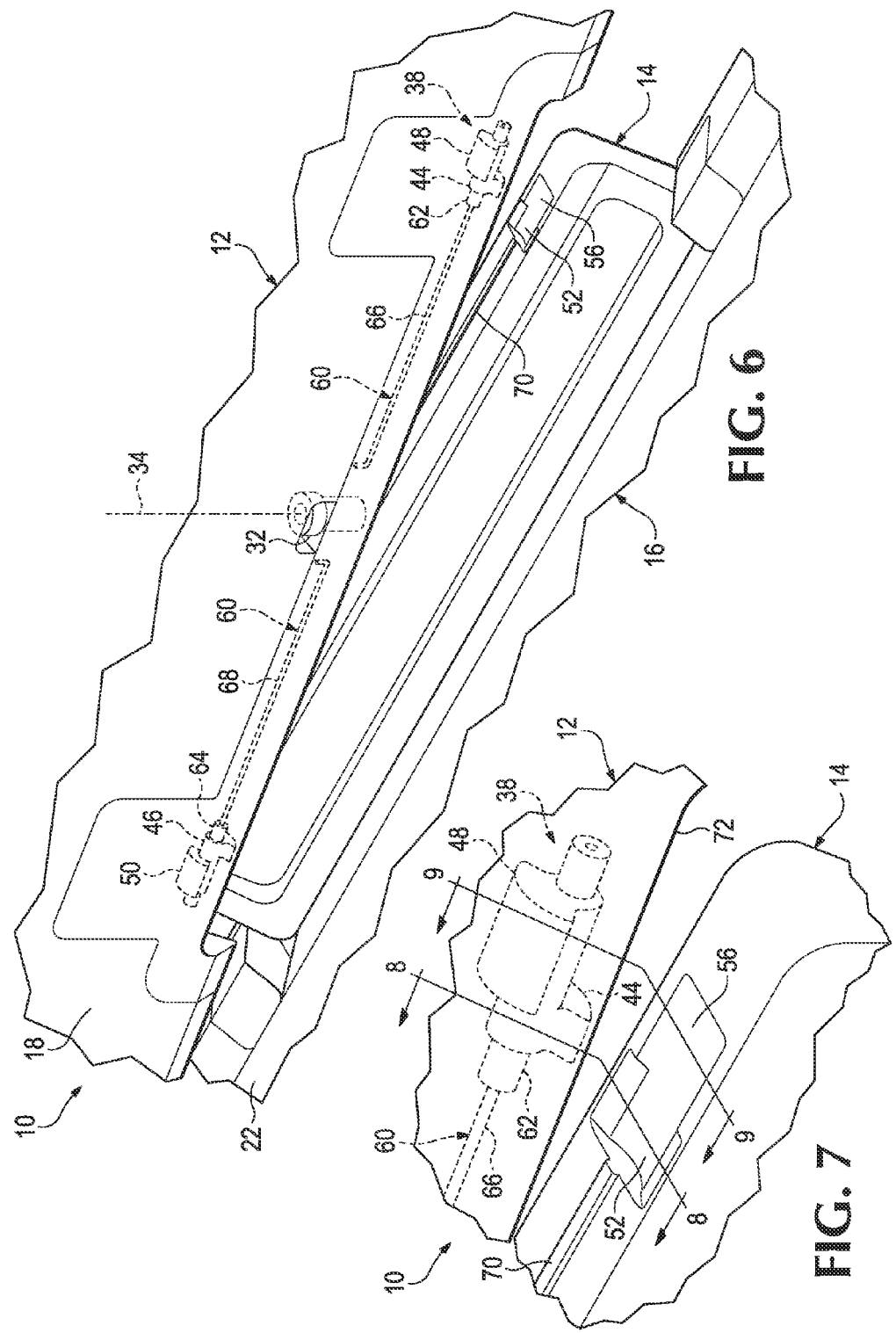

LOCKING ASSEMBLY

BACKGROUND

Consumers generally appreciate computing devices with reduced form factors to enhance portability and storage of such devices. They also tend to appreciate ease of use and reliability of such devices. Designers and manufacturers of computing devices may, therefore, endeavor to create and provide such computing devices directed toward one or more of these objectives.

BRIEF DESCRIPTION OF THE DRAWINGS

The following detailed description references the drawings, wherein:

FIG. 6 is an example of an enlarged view of a portion of the computing device of FIG. 3.

FIG. 7 is an example of an enlarged view of a portion of a locking assembly of the computing device of FIG. 6.

DETAILED DESCRIPTION

Some laptop or notebook-style computing devices may include a feature that allows them to be converted from a conventional style of use that includes a keyboard and a screen to a tablet-style of use where the screen is used for both viewing and input. One way in which this can be implemented is through the use of a shaft about which the screen of the computing device may rotate to convert it from the conventional style of use to the tablet style of use.

A hard stop or detent-style mechanism can be used to help provide a way to positively locate and inhibit the rotation of the screen about the shaft so a computing device may be used in the conventional manner. The use of such a stop or mechanism, however, requires a relatively large shaft which correspondingly results in an increase in the size of the computing device. This increase in size of the computing device can be undesirable to some consumers. Additionally, if the screen is rotated too fast or hard, it may pass or jump over the stop or detent mechanism, failing to positively locate and secure the screen in the desired position.

Figure 1:
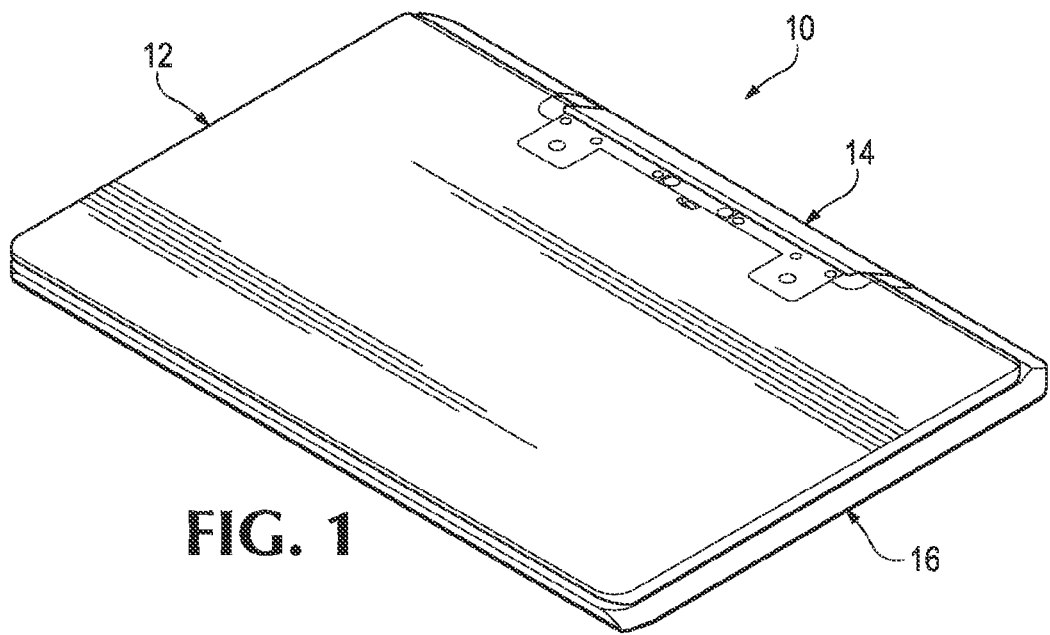
FIG. 1 is an example of a computing device in a closed position.

An example of a computing device 10 that is directed to addressing these challenges is illustrated in FIG. 1. As used herein, the term "computing device" is defined as including, but not necessarily limited to, a computer, tablet, server, laptop, mobile phone, or personal digital assistant.

Referring again to FIG. 1, computing device 10 includes a panel 12, a hinge arm 14, and a base 16. As can be seen in FIG. 1, computing device 10 is shown in a closed position which it may assume during periods of non-use to protect the components of computing device 10 from damage, debris, etc. The closed position shown in FIG. 1 also helps reduce the overall size and profile of computing device 10 allowing it to be more easily stored and transported.

Figure 2:
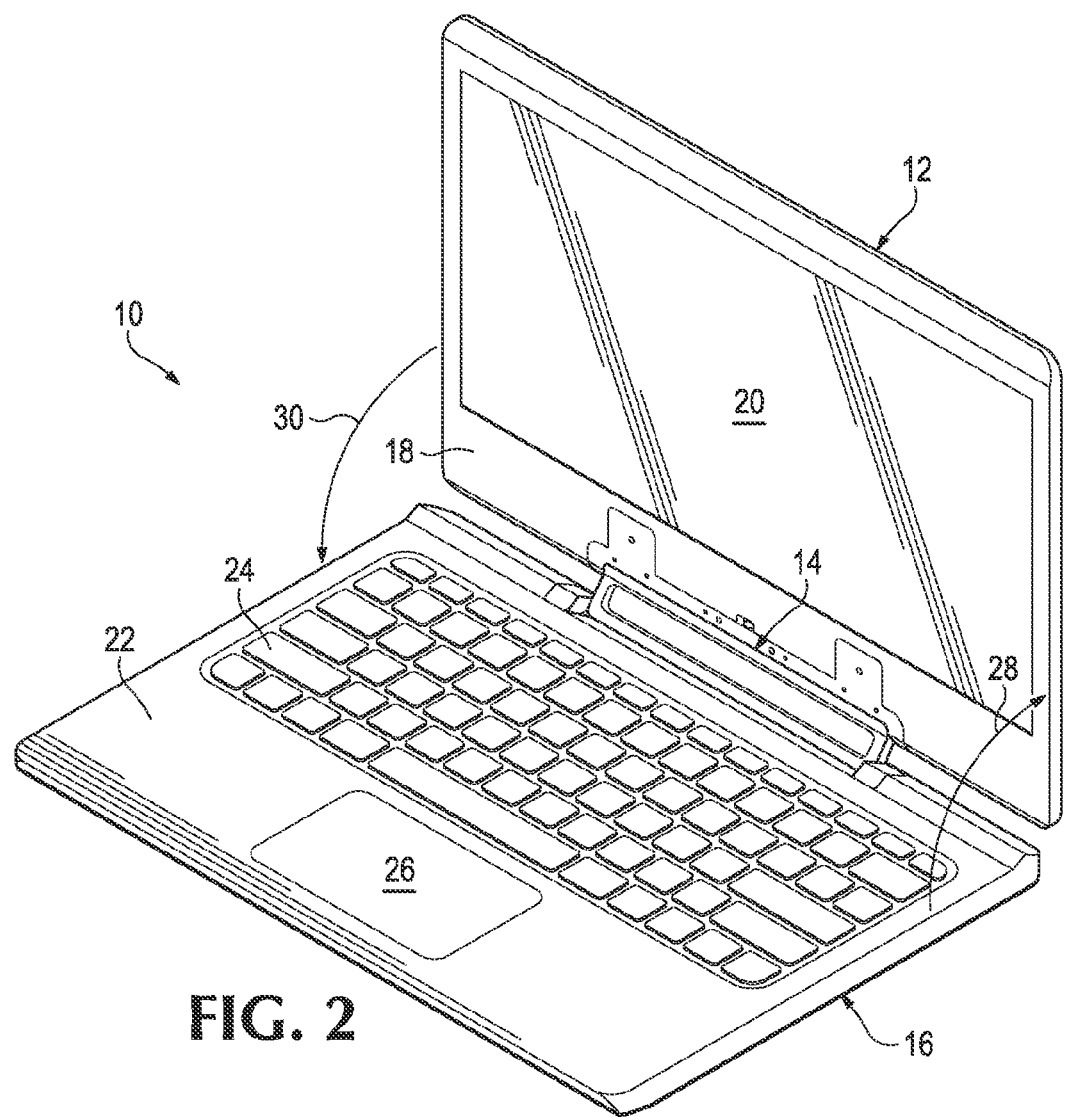
FIG. 2 is an example of the computing device of FIG. 1 in an open position.

An example of computing device 10 in an open position is shown in FIG. 2. As can be seen in FIG. 2, panel 12 has an interior portion 18 that includes a display or screen 20. As can also be seen in FIG. 2 interior portion 22 of base 16 includes a keyboard 24 and a track pad 26. Hardware, software, and firmware components (not shown) of computing device 10 are housed within panel 12 and base 16. Computing device 10 may additionally include one or more jacks, connectors, openings, slots, and/or sockets for connection with one or more cables, dongles, plugs, cards, peripheral devices and/or accessories.

As can additionally be seen in FIG. 2 hinge arm 14 couples or connects panel 12 and base 16 together. Hinge arm 14 also allows panel 12 to be moved in the direction of arrow 28 to open computing device 10 from the closed position shown in FIG. 1 to the open position shown in FIG. 2, Hinge arm 14 additionally allows panel 12 to be moved in the direction of arrow 30 to close computing device 10 from the open position shown in FIG. 2 to the closed position shown in FIG. 1.

Figure 3:
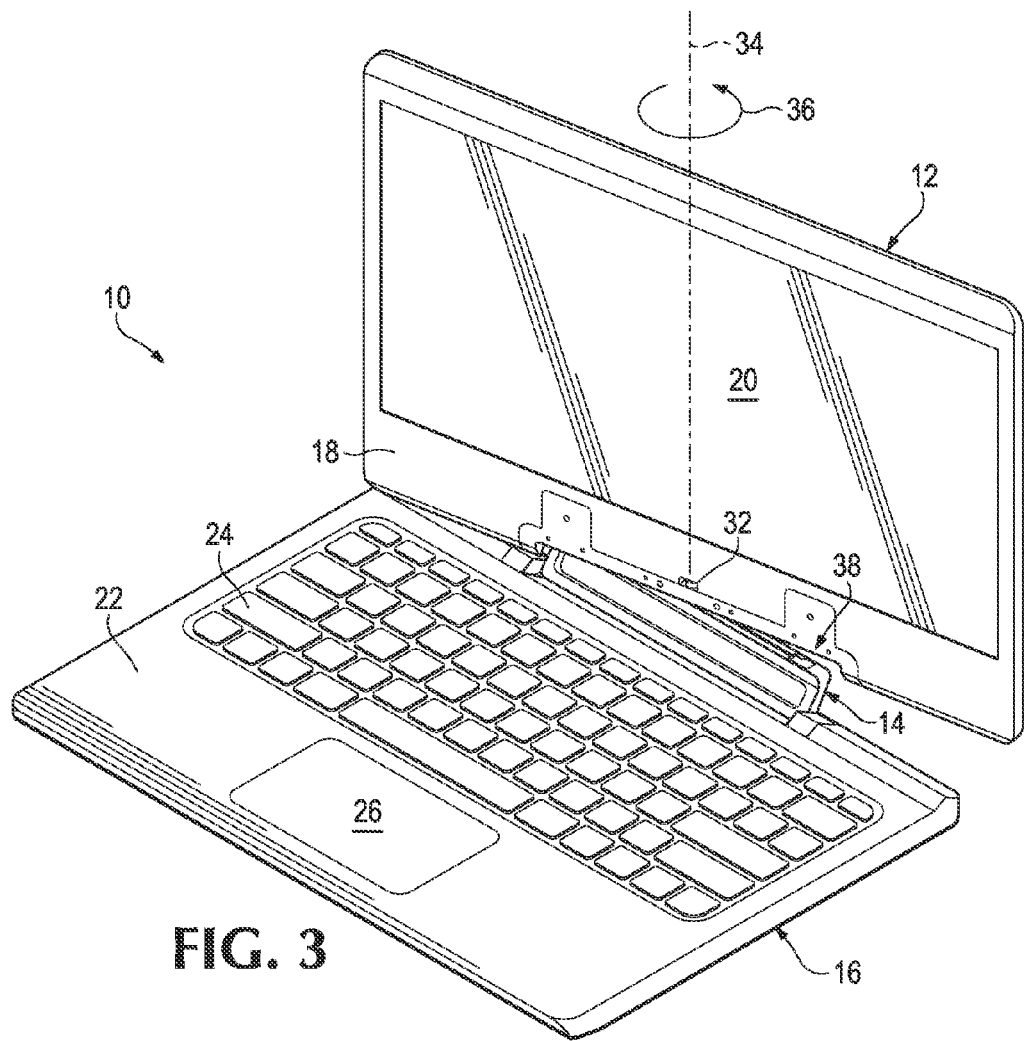
FIG. 3 is an example of the computing device of FIG. 2 beginning to be converted from a conventional style of use to a tablet-style of use.

An example of computing device 10 beginning to be converted from a conventional style of use to a tablet-style of use is shown in FIG. 3. As can be seen in FIG. 3, hinge arm 14 includes a shaft 32 about which panel 12 may rotate, as indicated by axis 34 and arrow 36. This rotation is limited by a locking assembly 38 (discussed more fully below) that must be released to rotate panel 12. Locking assembly 38 is designed to help releasably secure panel 12 in the position shown in FIG. 2 so that it may be used in the conventional style as a laptop.

Figure 4:
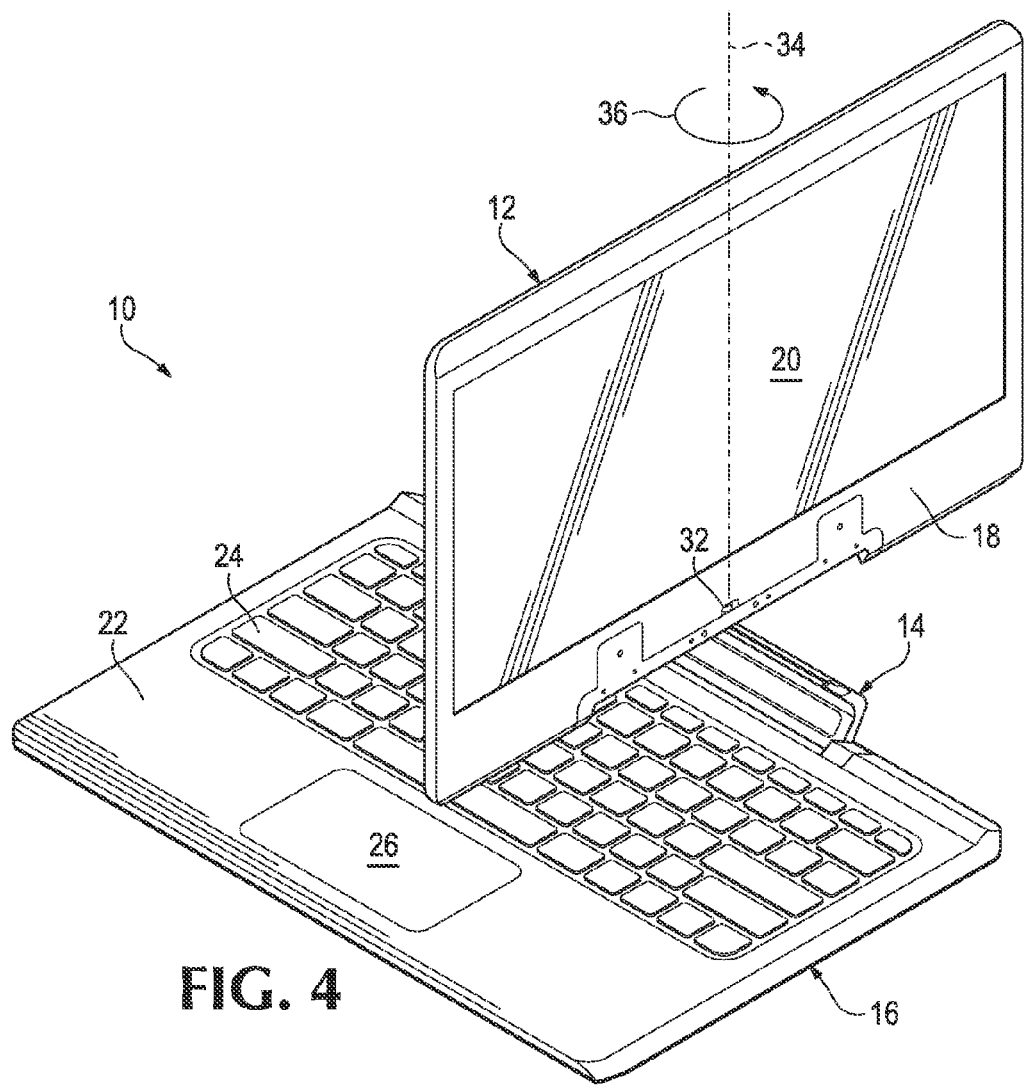
FIG. 4 is an example of a panel of the computing device of FIG. 3 continuing to be rotated to convert the computing device from the conventional style of use to the tablet-style of use.
Figure 5:
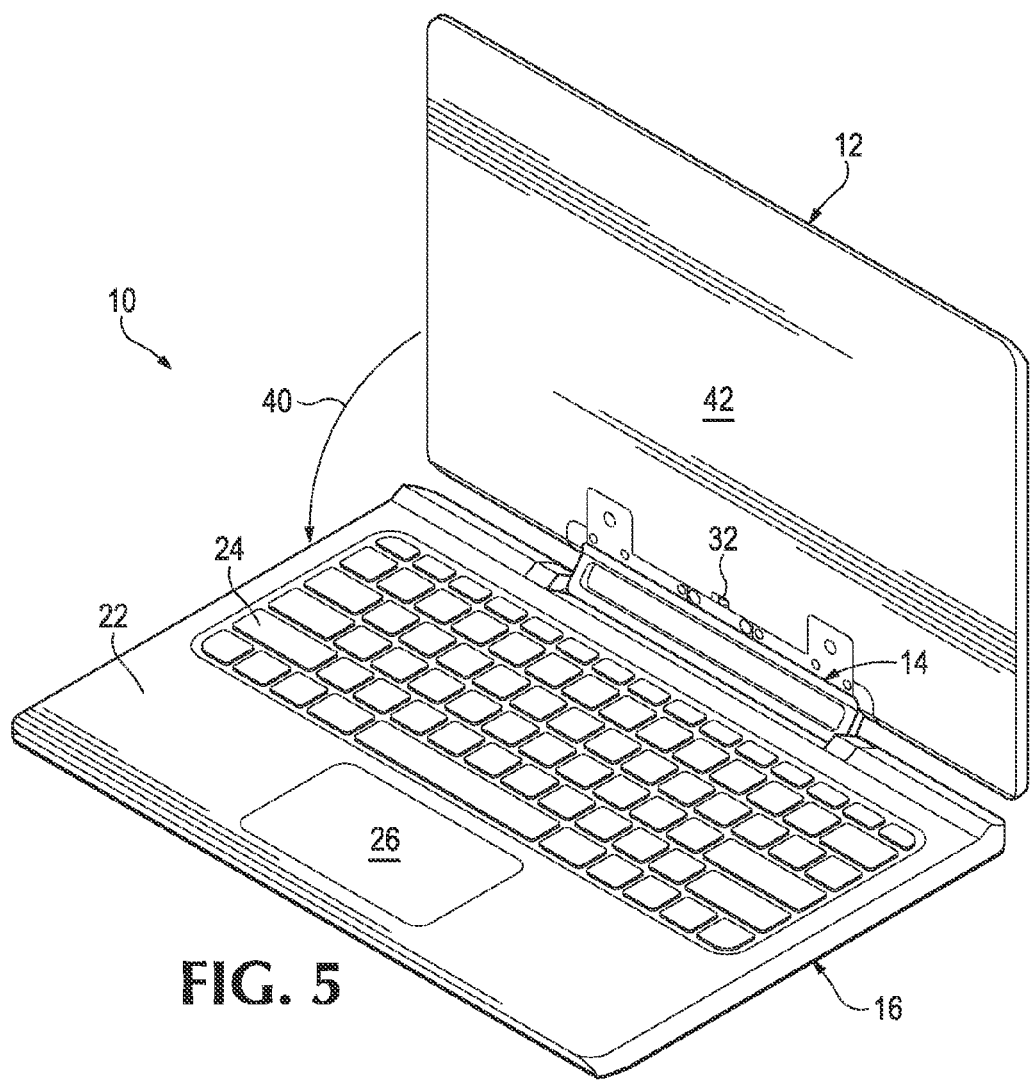
FIG. 5 is an example of the panel of the computing device of FIG. 4 completely rotated to convert the computing device to the tablet-style of use.

An example of panel 12 of computing device 10 continuing to be rotated in the direction of arrow 36 to convert computing device 10 from the conventional style of use to the tablet-style of use is shown in FIG. 4. An example of panel 12 of computing device 10 completely rotated to convert computing device 10 to the tablet-style of use is shown in FIG. 5, Locking assembly 38 (not shown in FIG. 5), limits further rotation of panel 12 about shall 32 to help releasably secure panel 12 in the position shown in FIG. 5 so that it may be used in the tablet-style. All that remains is for panel 12 to be moved in the direction of arrow 40 to place exterior portion 42 of panel 12 adjacent interior portion 22 of base 16.

An example of an enlarged view of a portion of computing device 10 illustrated in FIG. 3, above, is shown in FIG. 6. As can be seen in FIG. 6, locking assembly 38 of computing device 10 includes a first cam lobe 44 and a second cam lobe 46. Locking assembly 38 also includes a first cam lobe lock 48 coupled to first cam lobe 44 and a second cam lobe lock 50 coupled to second cam lobe 46. As can also be seen, in this example, first cam lobe 44, second cam lobe 46, first cam lobe lock 48, and second cam lobe lock 50 are mounted to panel 12. It is to be understood, however, that in other examples of locking assembly 38 of computing device 10, first cam lobe 44, second cam lobe 46, first cam lobe lock 48, and/or second cam lobe lock 50 may be mounted elsewhere, for example, in hinge arm 14.

Locking assembly 38 additionally includes a first cam lobe recess 52 that receives first earn lobe 44 during movement of first earn lobe 44 (as discussed more fully below) and a second cam lobe recess 54 (see FIG. 10B) that receives second cam lobe 46 during movement of second cam lobe 46. Locking assembly 38 further includes a first cam lock recess 56 that receives first cam lobe lock 48 via movement of first cam lobe 44 and a second cam lobe lock recess 58 (see FIG. 10B) that receives second earn lobe lock 50 via movement of second earn lobe 46. As can be seen, in this example, first cam lobe recess 52, second cam lobe recess 54, first cam lobe lock recess 56, and second cam lobe lock recess 58 are defined by hinge arm 12. It is to be understood, however, that in other examples of locking assembly 38 of computing device 10, first cam lobe recess 52, second cam lobe recess 54, first cam lobe lock recess 56, and/or second cam lobe lock recess 58 may be defined by other structure of computing device 10, for example, by panel 12.

As can additionally be seen in FIG. 6, locking assembly 38 of computing device 10 includes a biasing member 60 coupled to first cam lobe 44 via collar 62 and second cam lobe 46 via collar 64. Biasing member 60 urges first cam lobe 44 into a first position (discussed more fully below) and second cam lobe 46 into a first position (as also discussed more fully below In this example, biasing member 60 includes a first torsion spring 66 and a second torsion spring 68, It is to be understood, however, that in other examples of locking assembly 38, biasing member 60 may utilize components other than or in addition to torsion springs 66 and 68.

An example of an enlarged view of a portion of locking assembly 38 of computing device 10 is shown in 7. As can be seen in FIG. 7, computing device 10 includes a rub strip 70 between panel 12 and hinge arm 14 to help reduce damage to panel 12 and hinge arm 14 caused by contact between them. As can also be seen in FIG. 7, in this example, rub strip 70 is mounted to hinge arm 14. However, it is to be understood that in other examples of computing device 10, rub strip 70 may be mounted elsewhere, for example to bottom 72 of panel 12. Rub strip 70 may be made from any suitable material or combination of materials that help reduce friction between panel 12 and hinge arm 14 such as, for example, fabric, cloth, silicon, elastomer, polymer, etc.

Figure 8:
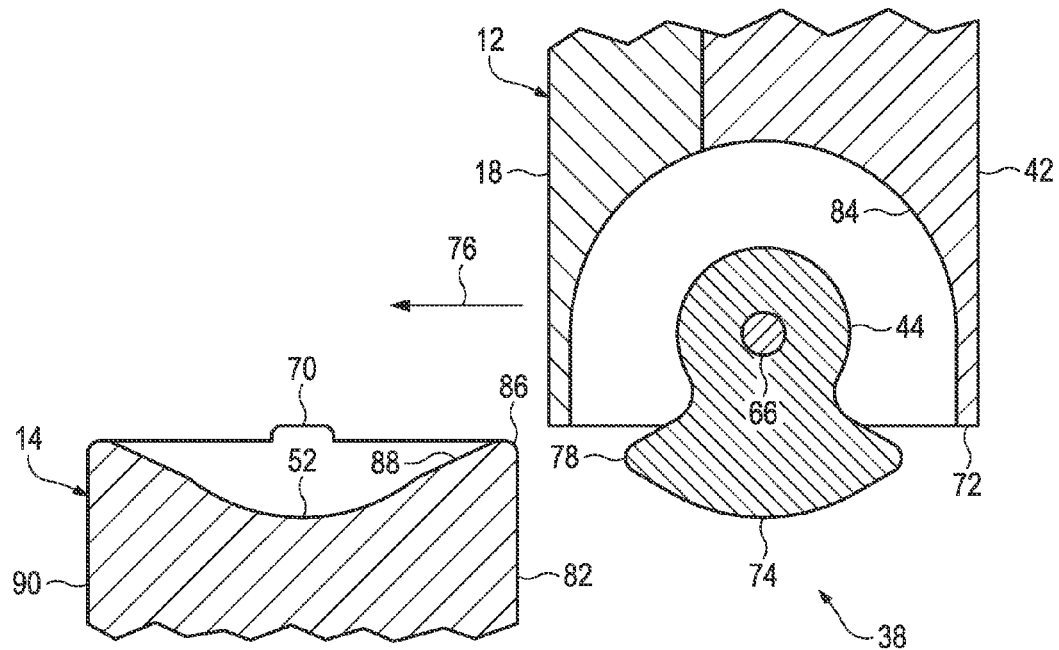
FIG. 8 is an example of a cross-sectional view taken along line 8-8 of FIG. 7.
Figure 8A:
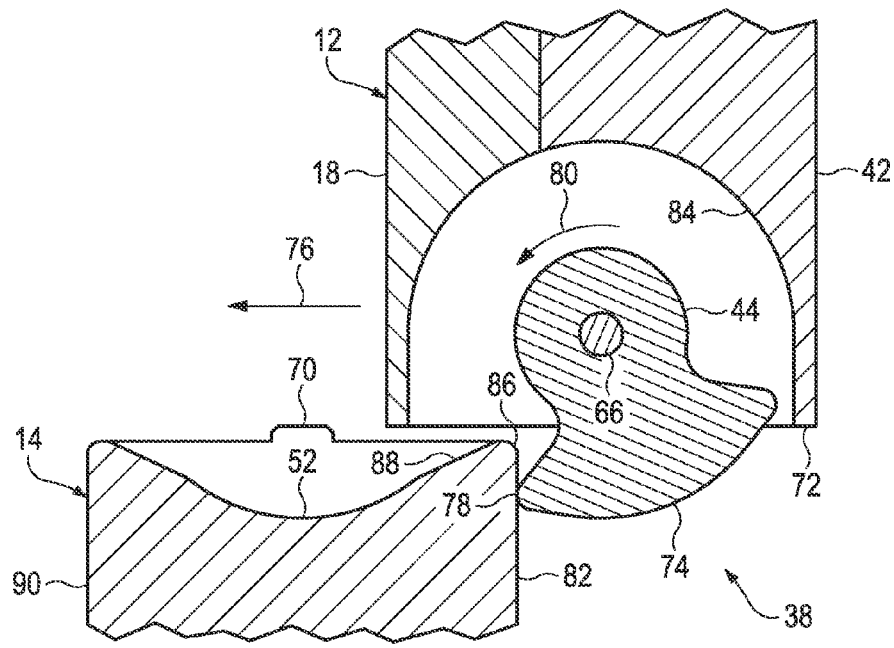
FIGS. 8A-8C are examples of the operation of a first cam lobe of the locking assembly in connection with movement of the panel of the computing device.
Figure 8B:
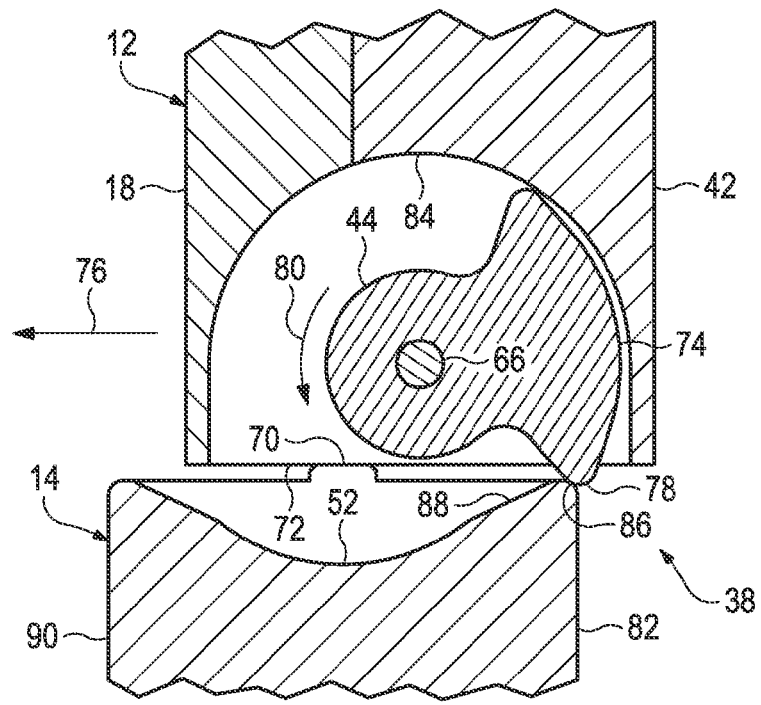
Figure 8C:
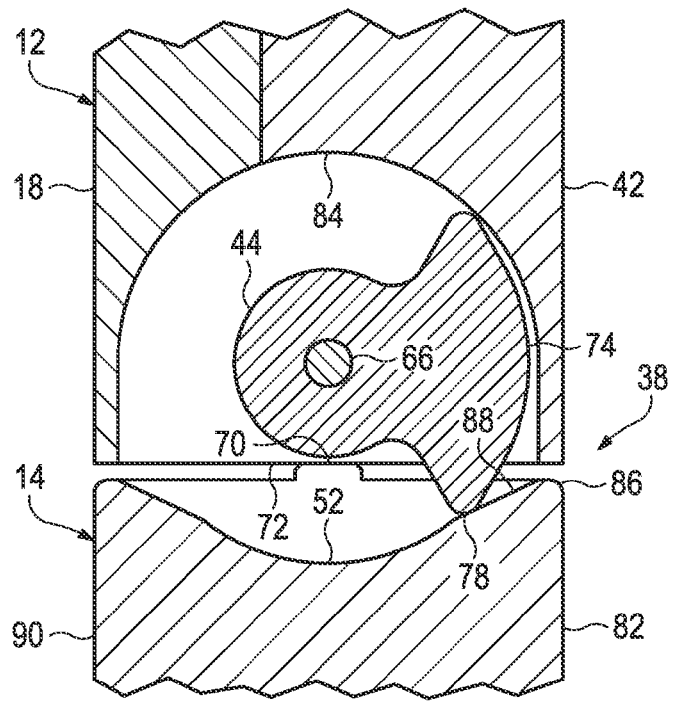

An example of a cross-sectional view taken along line 8-8 of FIG. 7 is shown in FIG. 8 As can be seen in FIG. 8. first cam lobe 44 is in a first position and includes a first curved surface 74 having a first radius of curvature, Examples of the operation of first cam lobe 44 in connection with movement of panel 12 in the direction of arrow 76 are illustrated in FIGS. 8A-8C. As can be seen in FIG. 8A, movement of panel 12 in the direction of arrow 76 eventually results in tip 78 of first cam lobe 44 contacting side 82 of hinge arm 14 causing first cam lobe 44 to begin o move or rotate in the direction indicated by arrow 80 into cavity or recess 84 defined by panel 12.

Continued movement of panel 12 in the direction of arrow 76 causes tip 78 to move along side 82 of hinge arm 14 until it reaches edge 86 of first cam lobe recess 52. This causes first cam lobe 44 to further move or rotate in the direction indicated by arrow 80 into cavity or recess 84 as shown in FIG. 8B. Further movement of panel 12 in the direction of arrow 76 causes tip 78 to move along first surface 88 of first cam lobe recess 52 from edge 86 to the position shown in FIG. 8C which helps center panel 12 with respect to hinge arm 14. As can be seen from comparison of FIGS. 8 and 8C, first cam lobe 44 rotates approximately ninety degrees from the first position shown in FIG. 8 to a second position within cavity or recess 84 shown in FIG. 8C, This movement or rotation of first cam lobe 44 from the first position shown in FIG. 8 to the second position shown in FIG. 8C has compressed torsion spring 66 storing energy in biasing member 60 that can be used later to move or rotate first cam lobe 44 from the second position to the first position (as discussed more fully below).

Although not shown, it is to be understood that the discussion above regarding first cam lobe 44 in connection with FIGS. 8 and 8A-8C, is also applicable to second cam lobe 46. That is, second cam lobe 46 contacts side 90 of hinge arm 14 and second surface 92 (see FIG. 10B) of second cam lobe recess 54, undergoing similar movement or rotation to that of first cam lobe 44 during its contact with side 82 of hinge aim 14 and first surface 88 of first cam lobe recess 52 which also helps center panel 12 with respect to hinge arm 14. Second cam lobe 46 also rotates approximately ninety degrees from its first position its second position. This movement or rotation of second cam lobe 46 from a first position to a second position also compresses torsion spring 68 storing energy in biasing member 60 that can be used later to move or rotate second cam lobe 46 from the second position to the first position.

Figure 9:
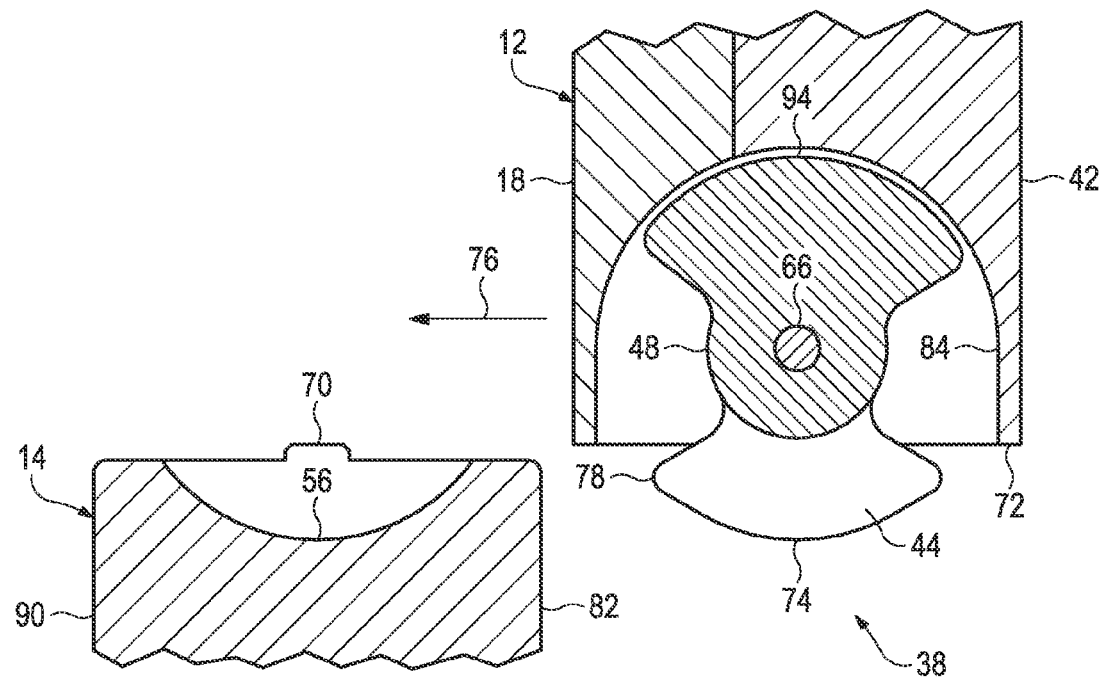
FIG. 9 is a cross-sectional view taken along line 9-9 of FIG, 7.

An example of a cross-sectional view taken along line 9-9 of FIG. 7 is shown in FIG. 9, As can be seen in FIG. 9, first cam lobe lock 48 is in a first position inside cavity or recess 84 and includes a second curved surface 94 having a second radius of curvature. In at least some examples of locking assembly 38, the first radius of curvature of first curved surface 74 of first cam lobe 44 and the second radius of curvature of second curved surface 94 of first cam lobe lock 48 are substantially equal. As can also be seen in FIG. 9 first cam lobe 44 is in the first position like that shown in FIG. 8.

Figure 9A:
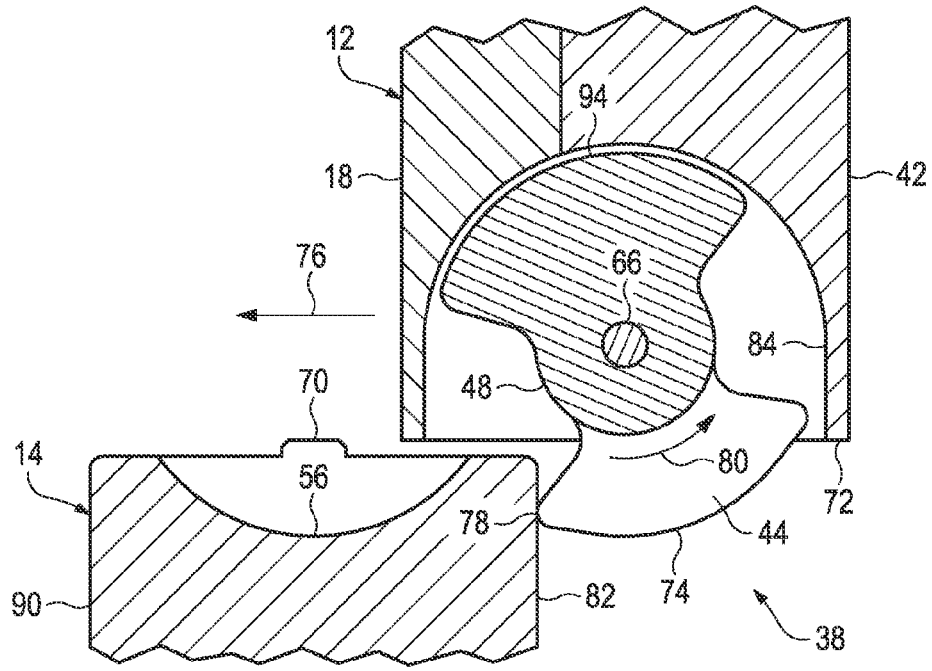
FIGS. 9A-9C are examples of the operation of a first cam lobe lock of the locking assembly in connection with movement of the panel of the computing device.
Figure 9B:
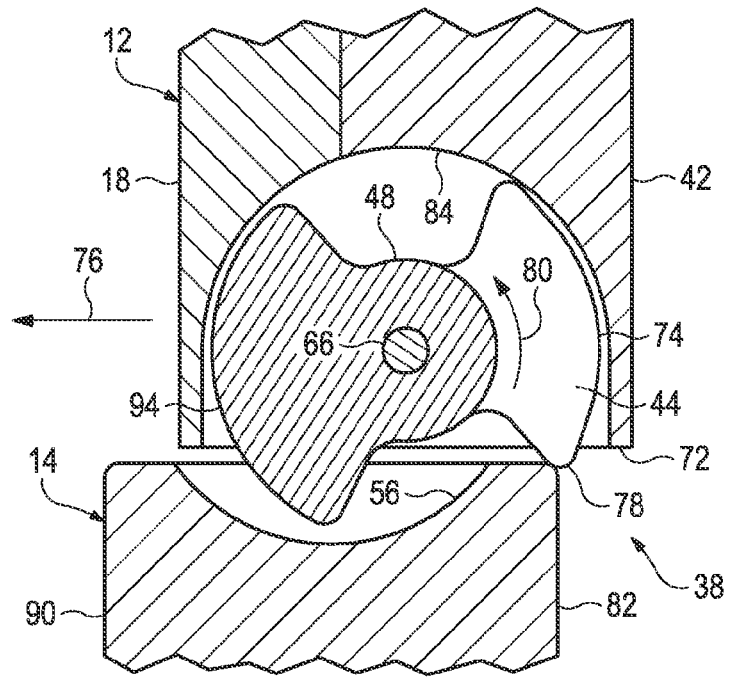
Figure 9C:
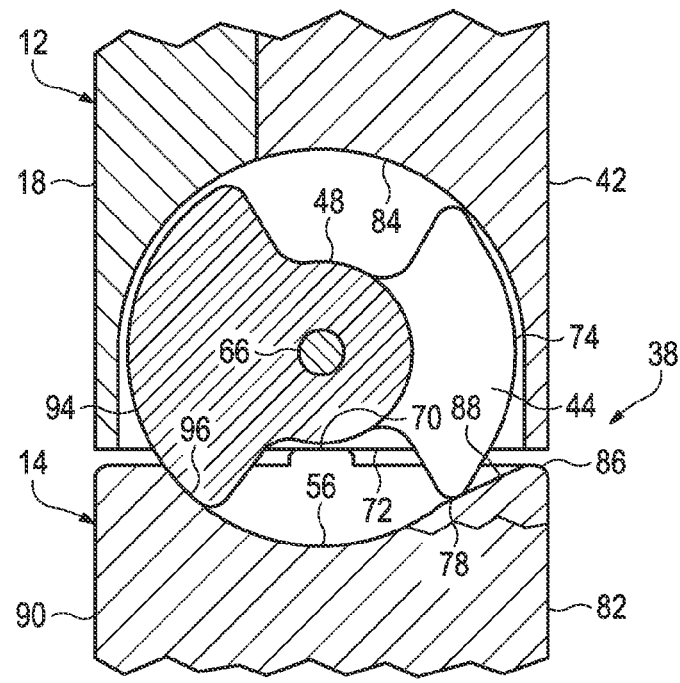

Examples of the operation of first cam lobe lock 48 in connection with movement of panel 12 in the direction of arrow 76 are illustrated in FIGS. 9A-9C. As can be seen in FIG. 9A, movement of panel 12 in the direction of arrow 76 eventually results in tip 78 of first cam lobe 44 contacting side 82 of hinge arm 14 causing first cam lobe 44 to begin to move or rotate in the direction indicated by arrow 80 into cavity or recess 84 defined by panel 12. This movement or rotation of first cam lobe 44 in turn causes first cam lobe lock 48 to also begin to move or rotate in the direction of arrow 80.

Continued movement of panel 12 in the direction of arrow 76 causes tip 78 to move along side 82 of hinge arm 14 which causes first cam lobe 44 to further move or rotate in the direction indicated by arrow 80 into cavity or recess 84 as discussed above and shown in FIG. 9B. This additional movement or rotation of first cam lobe 44 in turn causes first cam lobe lock 48 to move or rotate in the direction of arrow 80 so that first cafe lobe lock 48 is disposed in or received by first cam lobe lock recess 56. As discussed above, further movement of panel 12 in the direction of arrow 76 causes tip 78 of first cam lobe 44 to move along first surface 88 of first cam lobe recess 52 from edge 86 to the position shown in FIG. 8C. This additional movement of first cam lobe 44 in turn causes first cat lobe lock 48 to assume the position shown in FIG. 9C disposed within or received by first cam lobe lock recess 56 to limit additional or further rotation of panel 12 about shaft 32 in the direction of arrow 76 by virtue of engagement between second curved surface 94 and portion 96 of first cam lobe lock recess 56.

As can be seen from comparison of FIGS. 9 and 9C, first cam lobe lock 48 rotates approximately ninety degrees from the first position shown in FIG. 9 to a second position within cavity or recess 84 shown in FIG. 9C. This movement or rotation of first cam lobe lock 48 from the first position shown in FIG. 9 to the second position shown in FIG. 9C has compressed torsion spring 66 storing energy in biasing member 60 that can be used later to move rotate first cam lobe lock 48 from the second position to the first position.

Although not shown, it is to be understood that the discussion above regarding first cam lobe lock 48 in connection with FIGS. 9 and 9A-9C, is also applicable to second cam lobe lock 50. That is, second cam lobe 46 contacts side 90 of hinge arm 14 and second surface 92 (see FIG. 10B) of second cam lobe recess 54, undergoing similar movement or rotation to that of first cam lobe 44 during its contact with side 82 of hinge arm 14 and first surface 88 of first cam lobe recess 52. This rotation or movement of second cam lobe 46 in turn causes second cam lobe lock 50 to be received by or disposed in second cam lobe lock recess 58 to further help limit additional or further rotation of panel 12 about shaft 32. Second cam lobe lock 50 also rotates approximately ninety degrees from its first position to its second position. This movement or rotation of second cam lobe lock 50 from a first position to a second position also compresses torsion spring 68 storing energy in biasing member 60 that can be used later to move or rotate second cam lobe lock 50 from the second position to the first position.

Figure 10:
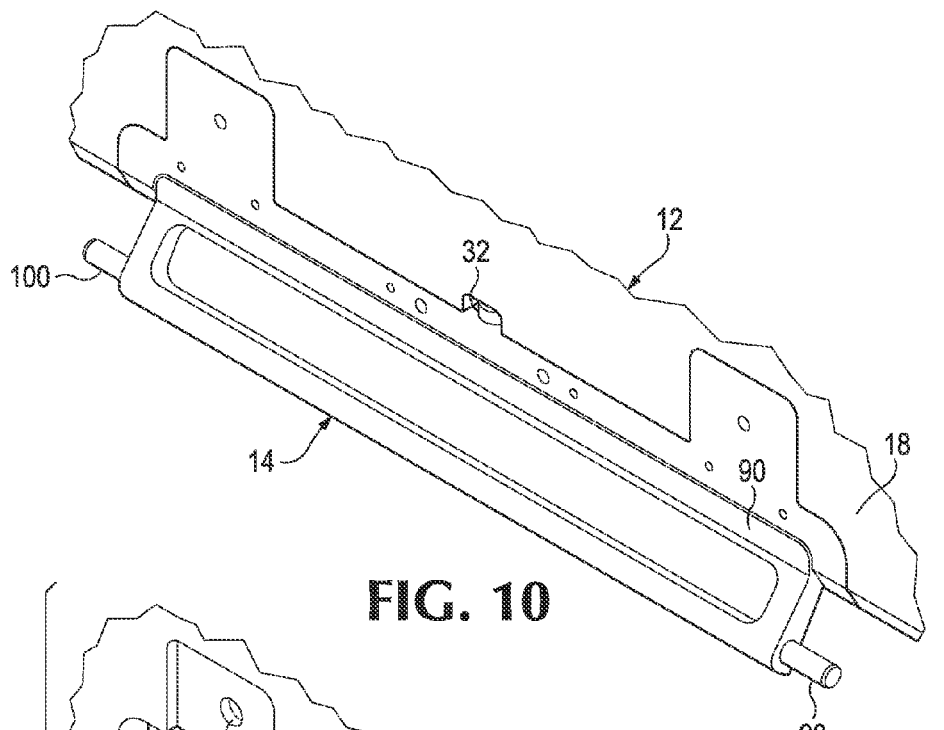
FIG. 10 is an example of a perspective view of the hinge arm and a portion of the panel of the computing device.

An example of a perspective view of hinge arm 14 and a portion of panel 12 of computing device 10 is shown in FIG. 10. As can be seen in FIG. 10, hinge arm 14 includes a first shaft 98 and a second shaft 100 that are rotatably coupled to base 16 (not shown in FIG. 10) of computing device 10. First shaft 98 and second shaft 100 allow hinge arm 14 to move between the position shown in FIG. 1 where computing device 10 is closed and the position shown in FIG. 2 where computing device 10 is open.

Figure 10A:
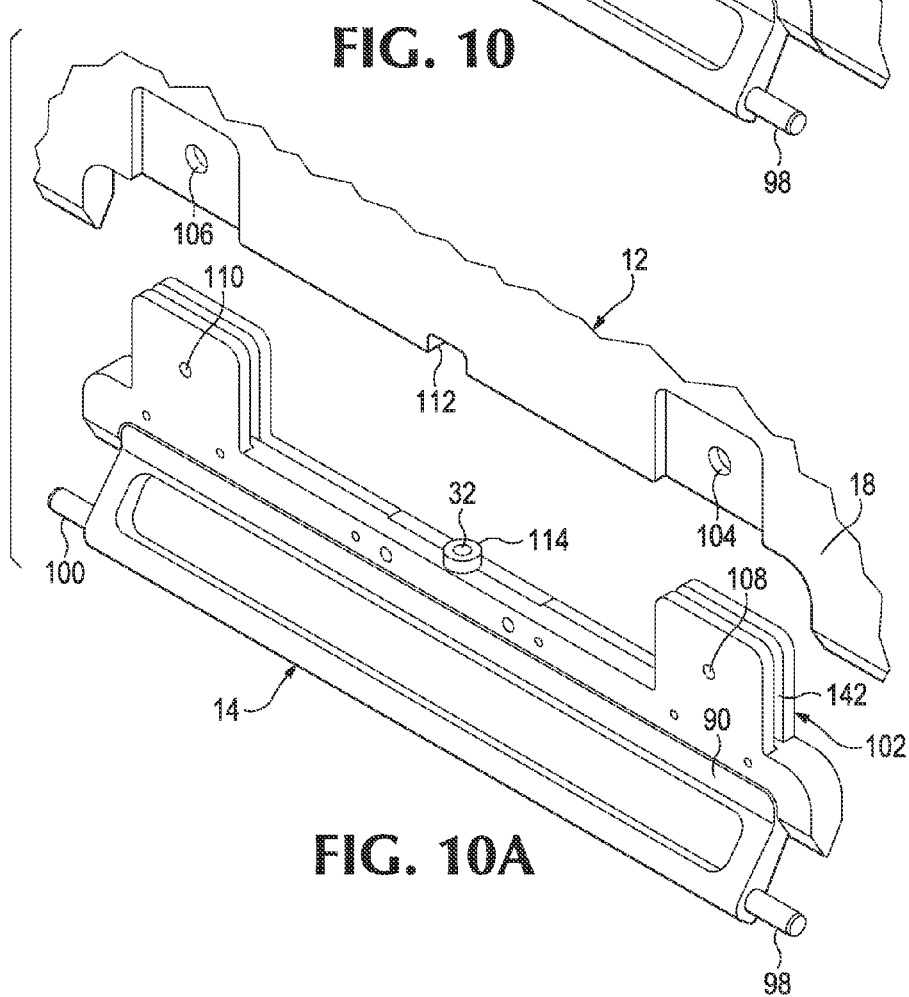
FIG. 10A is an example of a partially exploded perspective view of FIG. 10.

An example of a partially exploded perspective view of FIG. 10 is shown in FIG. 10A, As can be seen in FIG. 10A, hinge arm 14 includes a bracket assembly 102 that attaches panel 12 to hinge arm 14 via fasteners (not shown) that are disposed through openings 104 and 106 in panel 12 and openings 108 and 110 of bracket assembly 102, As can also be seen in FIG. 10A, panel 12 includes or defines a cavity or recess 112 in which head 114 of shaft 32 is disposed to allow panel 12 to rotate, as discussed above.

Figure 10B:
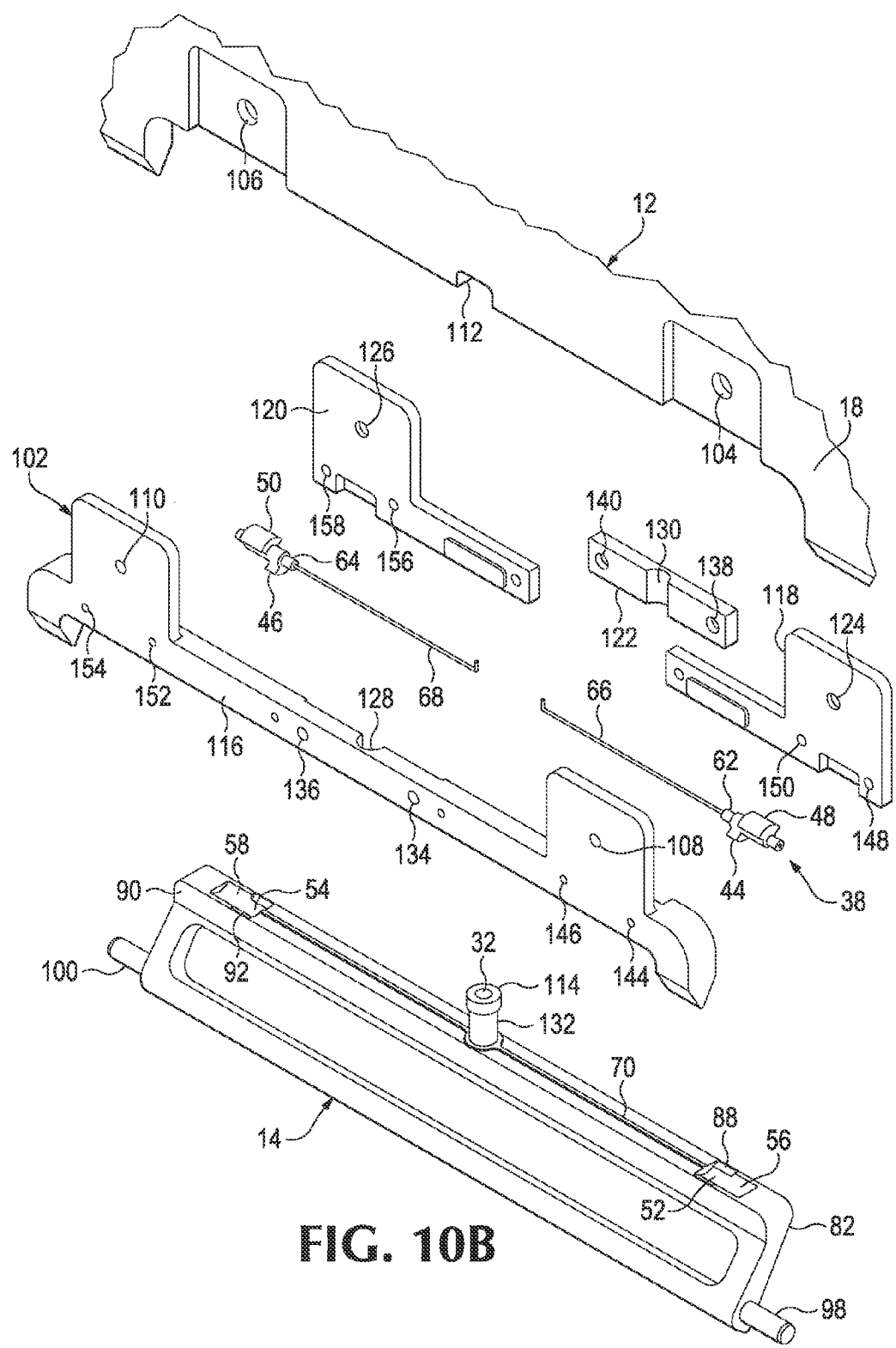
FIG. 10B is an example of a further exploded perspective view of FIG. 10.

An example of a further exploded perspective view of FIG. 10 is shown in FIG. 10B. As can be seen in FIG. 10B, bracket assembly 102 includes a first member 116 that attaches to interior portion 18 of panel 12 and respective second, third, and fourth members 118, 120, and 122 that attach to exterior portion 42 (see FIG. 5) of panel 12 via fasteners (not shown) that are disposed through openings 104 and 106 in panel 12 and openings 124 and 126 in respective second member 118 and third member 120. First member 116 and fourth member 122 include respective recess portions 128 and 130 that surround neck 132 of shaft 32 when joined together. First member 116 and fourth member 122 are joined together via fasteners (not shown) that are disposed through openings 134 and 136 of first member 116 and openings 138 and 140 of fourth member 122.

First member 116, second member 118, and gird member 120 define a cavity or recess 142 (see FIG. 10A) in which locking assembly 38 is disposed or received. First member 116 and second member 118 are joined together via fasteners (not shown) that are disposed through openings 144 and 146 of first member 116 and openings 148 and 150 of second member 118. First member 116 and third member 120 are joined together via fasteners (also not shown) that are disposed through openings 152 and 154 of first member 116 and openings 156 and 158 of third member 120.

Figure 11:
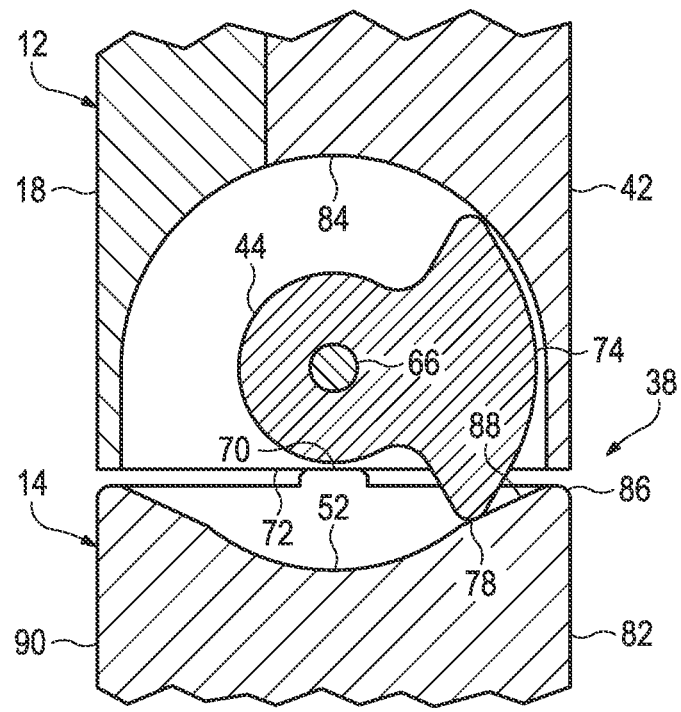
FIG. 11 is an example of a cross-sectional view of the first cam lobe in a second position.
Figure 11A:
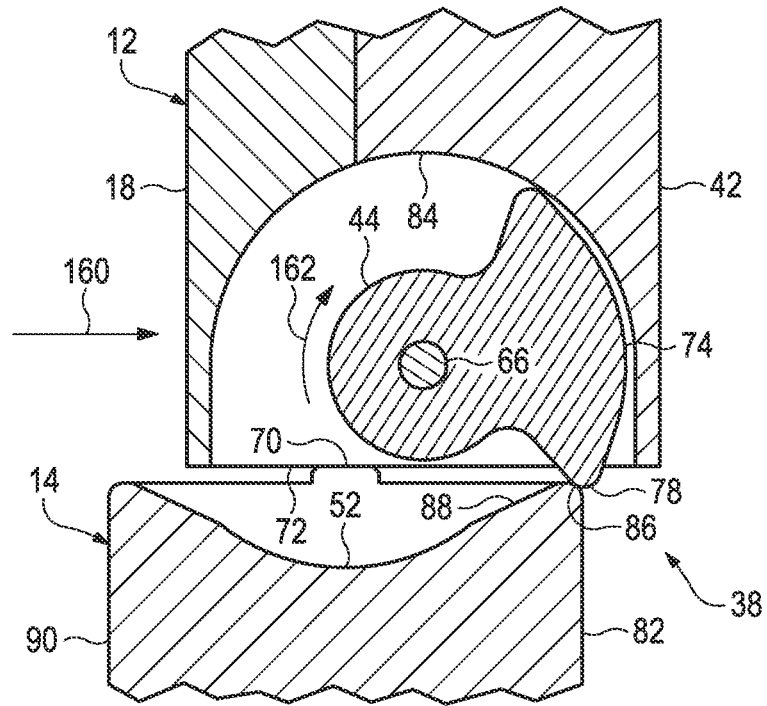
FIGS. 11A-11C are examples of further operation of the first cam lobe of the locking assembly in connection with movement of the panel of the computing device.

An example of a cross-sectional view of first cam lobe 44 in the second position is shown in FIG. 11. Examples of the further operation of first cam lobe 44 of locking assembly 38 in connection with movement of panel 12 in the direction of arrow 160 are illustrated in FIGS. 1 11C. As can he seen in FIG. 11A, movement of panel 12 in the direction of arrow 160 causes tip 78 of first cam lobe 44 to move along first surface 88 out of first cam lobe recess 52. Eventually, tip 78 of first cam lobe 44 reaches edge 86 and begins to rotate or move in the direction of arrow 162 under the urging of torsion spring 66 of biasing member 60.

Figure 11B:
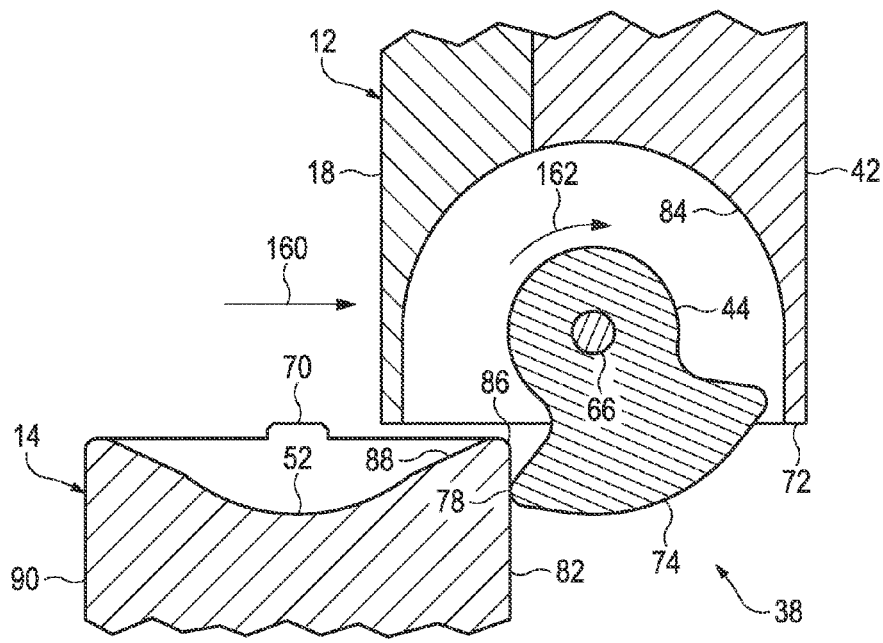
Figure 11C:
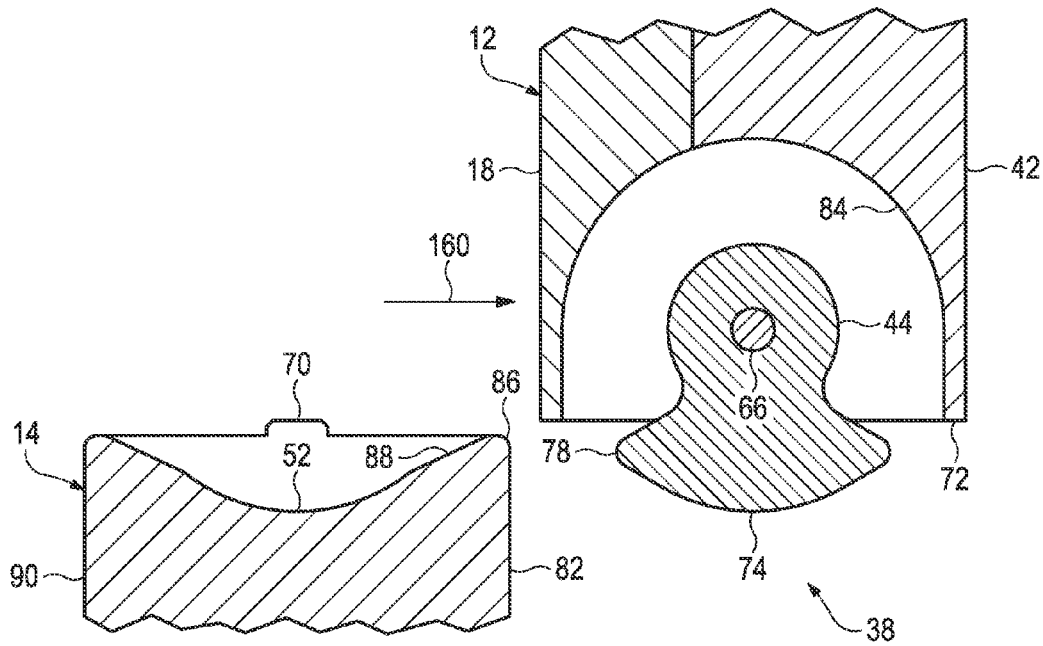

As can be seen in FIG. 11B continued movement of panel 12 in the direction of arrow 160 allows tip 78 to move along side 82 of hinge afro 14 while first cam lobe 44 continues to move or rotate in the direction indicated by arrow 162, under the urging of torsion spring 66 of biasing member 60, out of cavity or recess 84 defined by panel 12. Further movement of panel 12 in the direction of arrow 160 eventually disengages tip 78 from side 82 of hinge arm 14 allowing torsion spring 66 of biasing member 60 to urge first cam lobe 44 to the first position shown in FIG. 11C.

As can be seen from comparison of FIGS. 11 and 11C, first cam lobe 44 rotates approximately ninety degrees from the second position within cavity or recess 84 shown in FIG. 11 to the first position shown in FIG. 11C. As can be seen from comparison of FIGS. 8A-8C to that of FIGS. 11A-11C, the direction of rotation of first cam lobe 44 indicated by arrow 162 is opposite to the direction of rotation of first cam lobe 44 indicated by arrow 80.

Although not shown, it is to be understood that the discussion above regarding first cam lobe 44 in connection with FIGS. 11 and 11A-11C, is also applicable to second cam lobe 46. That is, movement of panel 12 in the direction of arrow 160 causes second cam lobe 46 to move along second surface 92 (see FIG. 10B) and then rotate or move out of second cam lobe recess 54. Second cam lobe 46 also rotates approximately ninety degrees from its second position its first position. This movement or rotation of second cam lobe 46 from the second position to the first position is opposite to the direction of rotation of second cam lobe 46 from the first position to the second position.

Figure 12:
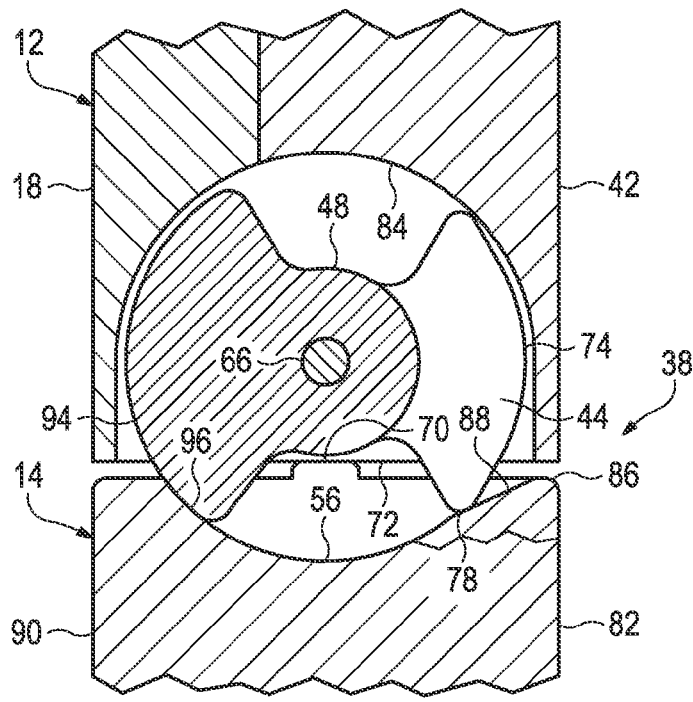
FIG. 12 is an example of a cross-sectional view of the first cam lobe lock in a second position.
Figure 12A:
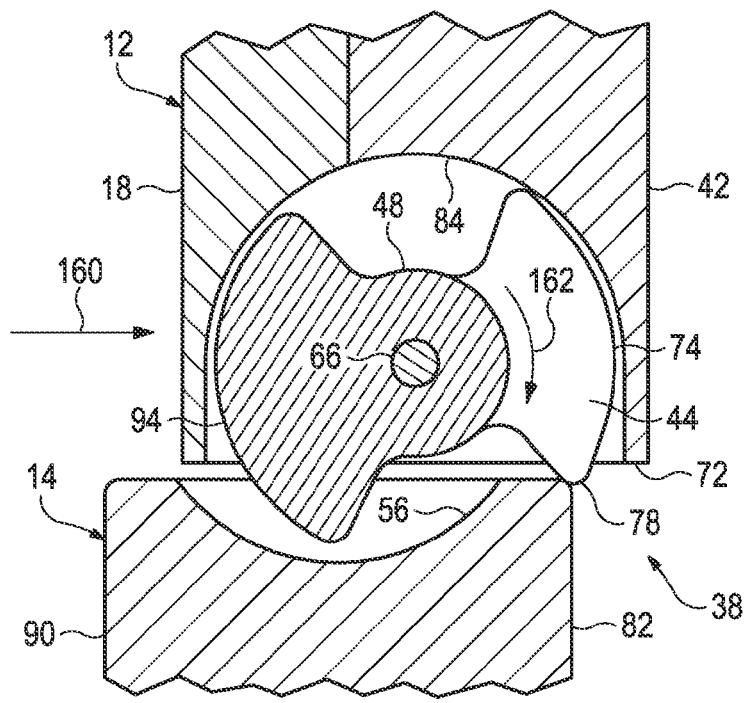
FIGS. 12A-12C are examples of farther operation of the first cam lobe lock of the locking assembly in connection with movement of the panel of the computing device.
Figure 12B:
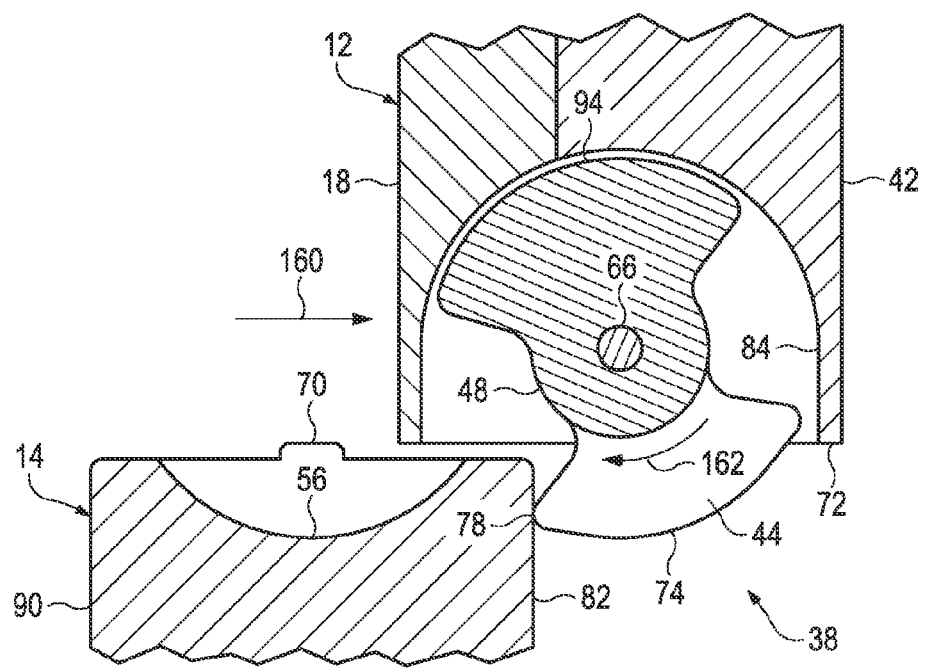
Figure 12C:
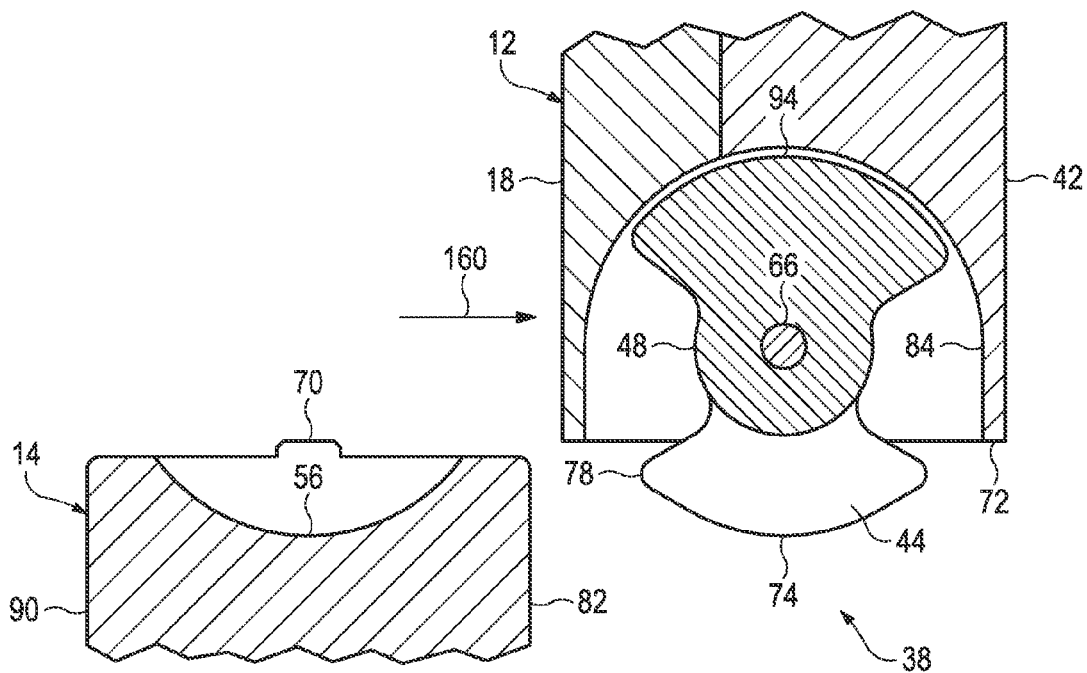

An example of a cross-sectional view of first cam lobe lock 48 in the second position is shown in FIG. 12. Examples of the further operation of first cam lobe lock 48 of locking assembly 38 in connection with movement of panel 12 in the direction of arrow 160 are illustrated in FIGS. 12A-12C. As can be seen in FIG. 12A and discussed above, movement of panel 12 in the direction of arrow 160 causes first cam lobe 44 to begin to move or rotate in the direction of arrow 162 under the urging of torsion spring 66 of biasing member 60. This movement or rotation of first cam lobe 44 in turn cause first cam lobe lock 48 to also begin to move or rotate in the direction of arrow 162.

As can be seen in FIG. 12B and also discussed above, continued movement of panel 12 in the direction of arrow 160 allows tip 78 to move along side 82 of hinge arm 14 while first cam lobe 44 continues to move or rotate in the direction indicated by arrow 162, under the urging of torsion spring 66 of biasing member 60, out of cavity or recess 84 defined by panel 12, This additional movement or rotation of first cam lobe 44 in turn causes first cam lobe lock 48 to move or rotate in the direction of arrow 162 out of first cam lobe lock recess 56, Further movement of panel 12 in the direction of arrow 160 eventually disengages tip 78 from side 82 of hinge arm 14 allowing torsion spring 66 of biasing member 60 to urge first earn lobe 44 to the first position shown in FIG. 12C. As can also be seen in FIG. 12C, this results in first cam lobe lock 48 returning to the first position within cavity or recess 84.

As can be seen from comparison of FIGS. 12 and 12C, first cam lobe lock 48 rotates approximately ninety degrees from the second position within first cam lobe lock recess 56 shown in FIG. 12 to the first position shown in FIG. 12C. As can be seen from comparison of FIGS. 9A-9C to that of FIGS. 12A-12C, the direction of rotation of first cam lobe lock 48 indicated by arrow 162 is opposite to the direction of rotation of first cam lobe lock 48 indicated by arrow 80.

Although not shown, it is to be understood that the discussion above regarding first cam lobe lock 48 in connection with FIGS. 12 and 12A-12C, is also applicable to second cam lobe lock 50. That is, movement of panel 12 in the direction of arrow 160 causes second cam lobe lock 50 to move or rotate out of second cam lobe lock recess 58 (see FIG. 10B). Second cam lobe lock 50 also rotates approximately ninety degrees from its second position to its first position. This movement or rotation of second cam lobe lock 50 from a second position to a first position is opposite to the direction of rotation of second cam lobe lock 50 from the first position to the second position.

As can be appreciated from the above discussion and illustrated examples, locking assembly 38 of computing device 10 provides the advantage of eliminating a stop or detent-style mechanism on shaft 32 to inhibit rotation of panel 12. This allows shaft 32 to be smaller which correspondingly allows the size of computing device 10 to be reduced. Additionally, locking assembly 38 positively locates and secures screen 20 and panel 12 in the desired position.

Although several examples hive been described and illustrated in detail, it is to be clearly understood that the same are intended by way of illustration and example only. These examples are not intended to be exhaustive or to limit the invention to the precise form or to he exemplary embodiments disclosed. Modifications and variations may well be apparent to those of ordinary skill in the art.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. A computing device, comprising:
a panel;
a hinge arm including a shaft about which the panel may rotate; and
a locking assembly including a first cam lobe, a first cam lobe lock coupled to the first cam lobe, and a first cam lobe lock recess that receives the first cam lobe lock via movement of the first cam lobe in a first direction to limit rotation of the panel about the shaft, wherein the first cam lobe includes a first curved surface having a first radius of curvature and the first cam lobe lock includes a second curved surface having a second radius of curvature, and further wherein the first radius of curvature is substantially equal to the second radius of curvature.

2. The computing device of claim 1, wherein movement of the first cam lobe in a second direction opposite from the first direction displaces the first cam lobe lock from the first cam lobe lock recess to allow rotation of the panel about the shaft.

3. The computing device of claim 1, further comprising a first cam lobe recess that receives the first cam lobe during the movement of the first cam lobe to substantially center the panel with respect to the hinge arm.

4. The computing device of claim 3, wherein the first cam lobe recess and the first cam lobe lock recess are defined by the hinge arm.

5. The computing device of claim 1, wherein the first cam lobe and the first cam lobe lock are mounted to the panel.

6. The computing device of claim 1, further comprising a biasing member coupled to the first cam lobe that urges the first cam lobe into a first position.

7. The computing device of claim 6, wherein engagement between the first cam lobe in the first position and the hinge arm causes the first cam lobe to begin to move.

8. The computing, device of claim 1, wherein the locking assembly additionally includes a second cam lobe, a second cam lobe lock coupled to the second cam lobe, and a second cam lobe lock recess that receives the second cam lobe lock via movement of the second cam lobe to limit rotation of the panel about the shaft.

9. A locking assembly to use with a computing device including a panel and a hinge arm having a shaft about which the panel may move, the locking assembly comprising:
a first cam lobe and a second cam lobe;
a first cam lobe lock coupled to the first cam lobe and a second cam lobe lock coupled to the second cam lobe;
a first cam lobe recess in which the first cam lobe is disposed during rotation of the first cam lobe and a second cam lobe recess in which the second cam lobe is disposed during rotation of the second cam lobe to substantially center the panel with respect to the hinge arm;
a first cam lobe lock recess into which the first cam lobe lock is rotated as a result of rotation of the first cam lobe and a second cam lobe lock recess into which the second cam lobe lock is rotated as a result of rotation of the second cam lobe to limit movement of the panel about the shaft and with respect to the hinge arm; and
a biasing member coupled to the first cam lobe and the second cam lobe that urges the first cam lobe into a first position and the second cam lobe into a first position.

10. The locking assembly of claim 9, wherein the first cam lobe is rotated during contact with the hinge arm and the second cam lobe is rotated during contact with the hinge arm.

11. The locking assembly of claim 9, wherein the first cam lobe recess includes a first surface along which the first cam lobe travels out of the first cam lobe recess and second cam lobe recess includes a second surface along which the second came lobe travels out of the second cam lobe recess.

12. The locking assembly of claim 9, wherein the first cam lobe includes a first curved surface having, a first radius of curvature and the first cam lobe lock includes a second curved surface having a second radius of curvature, and further wherein the first radius of curvature is substantially equal to the second radius of curvature.

13. The locking assembly of claim 9, wherein the first cam lobe rotates approximately ninety degrees and the second cam lobe rotates approximately ninety degrees.

\* \* \* \* \*

UNITED STATES PATENT AND TRADEMARK OFFICE
CERTIFICATE OF CORRECTION

PATENT NO. : 9,501,106 B2
APPLICATION NO. : 14/771495
DATED : November 22, 2016
INVENTOR(S) : Mark David Senatori Page 1 of 1

It is certified that error appears in the above-identified patent and that said Letters Patent is hereby corrected as shown below:

In Column 8, Line 39 approx., in Claim 8, delete "computing, device" and insert -- computing device --, therefor.

In Column 9, Line 11 approx., in Claim 12, delete "having, a" and insert -- having a --, therefor.

Signed and Sealed this
Twenty-eighth Day of February, 2017

Michelle K. Lee
*Director of the United States Patent and Trademark Office*